H. Burden,
Horseshoe Machine,

No. 35,746.      Patented July 1, 1862.

Sheet 1 - 3 Sheets.

Witnesses:
Wm. F. Burden
Jno. L. G. Knox.

Inventor:
Henry Burden

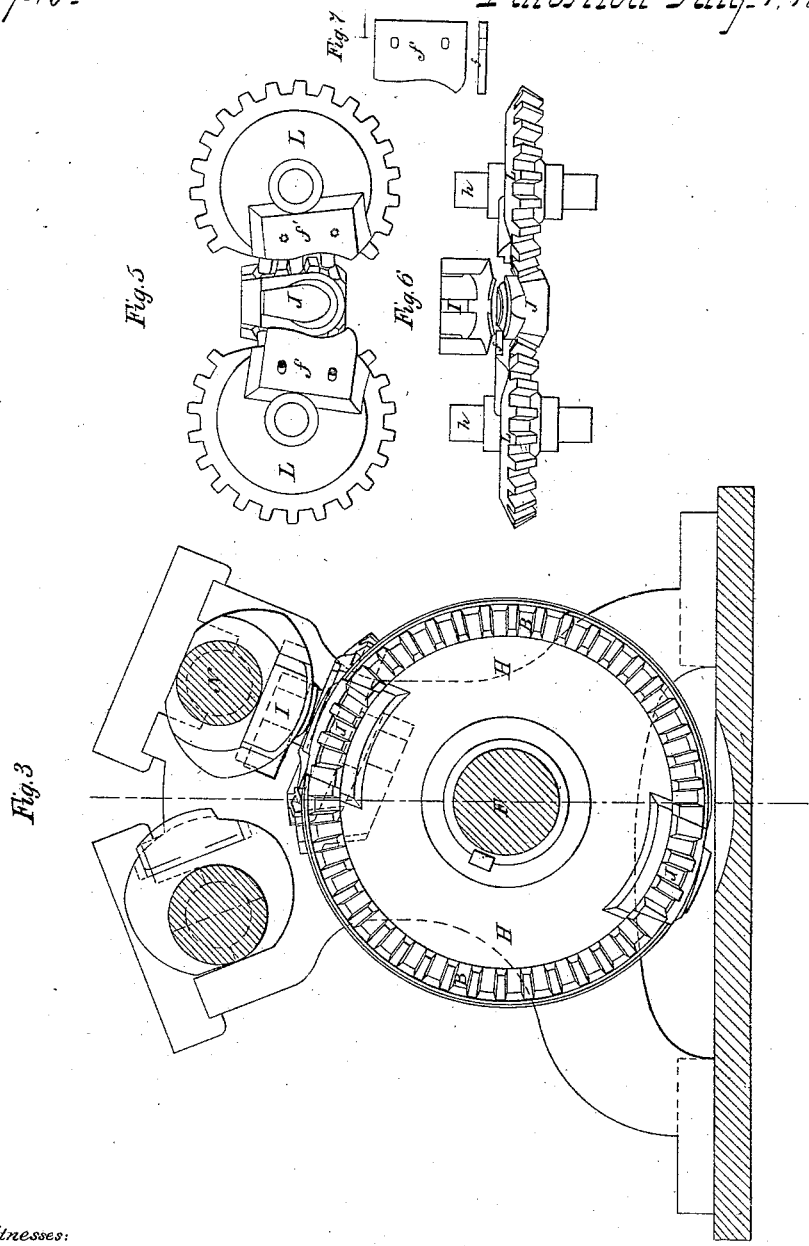

Sheet 3-3 Sheets.
H. Burden,
Horseshoe Machine,
N° 35,746. Patented July 1, 1862.
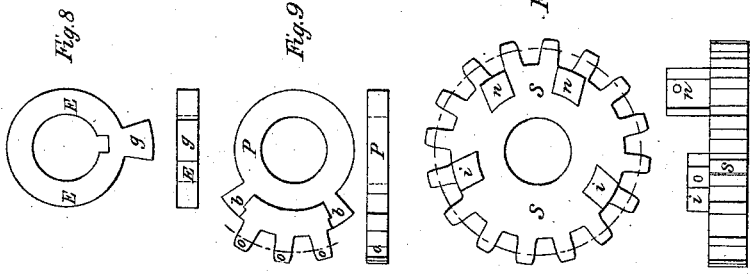
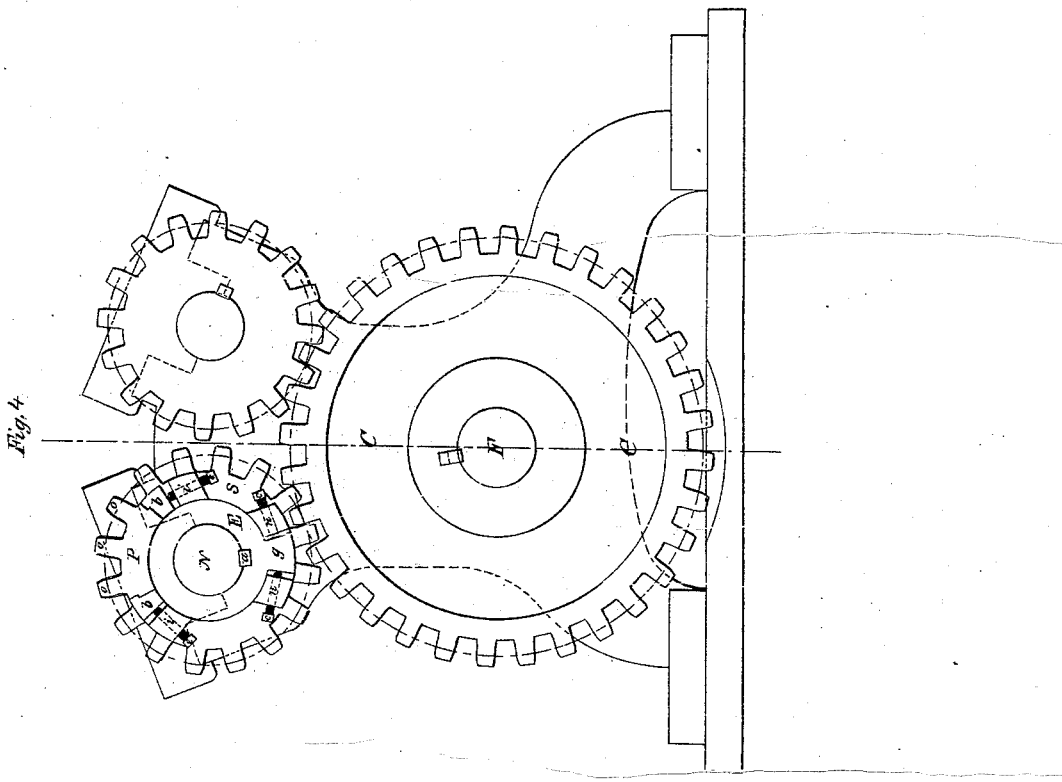
Witnesses:
Wm. F. Burden.
Jno. L. G. Knox.
Inventor:
Henry Burden

UNITED STATES PATENT OFFICE.

HENRY BURDEN, OF TROY, NEW YORK.

IMPROVED MACHINE FOR MAKING HORSESHOES.

Specification forming part of Letters Patent No. 35,746, dated July 1, 1862.

*To all whom it may concern:*

Be it known that I, HENRY BURDEN, of the city of Troy, in the county of Rensselaer and State of New York, have invented a new and useful Improvement in Machinery for Making Shoes for Horses, Mules, and other Animals; and I do hereby declare that the following is a full and exact description thereof, reference being had to the annexed drawings.

In the class of machines for making horse and mule shoes that have revolving dies a great difficulty has been experienced in giving a proper shape and finish to the outer edge of the shoe, in consequence of the creaser forcing the iron out of shape and frequently splitting it in the process of creasing and punching, and on this account the crease and holes in shoes could not be made as near to the edge as was desirable.

My improvement consists in a new mode of supporting the outer edge of the shoe during the operation of creasing and punching, by which those difficulties have been removed and a more perfect shoe made than was otherwise practicable.

The drawings represent my improvement as applied to one of the horseshoe-machines for which Letters Patent were granted to me on the 30th day of June, 1857.

Figure 2:
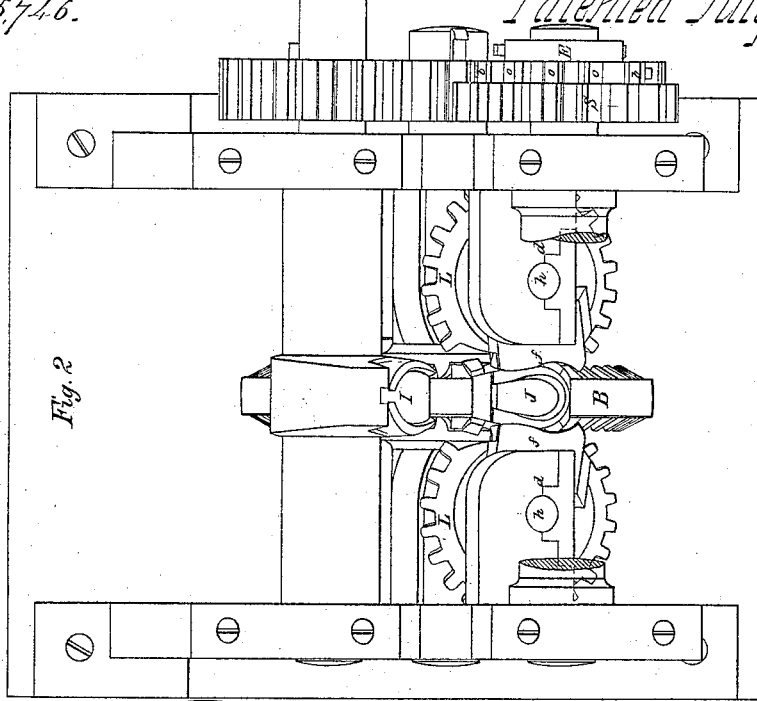
Figure 1:
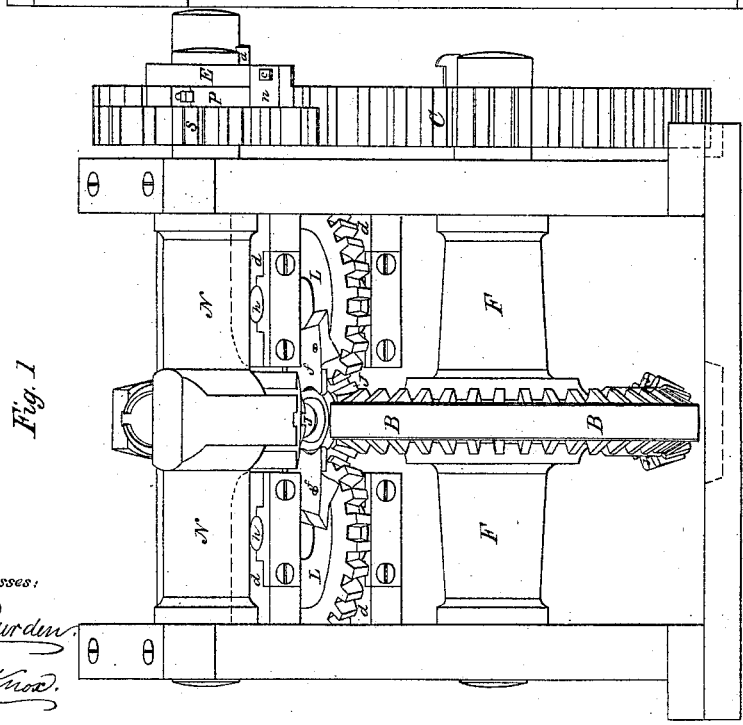

Figure 1 is an end view of the machine with my improvement applied. Fig. 2 represents it as seen from above with the creasing-shaft removed, the better to exhibit the parts beneath it. The other drawings represent parts to be hereinafter explained.

Upon the sides of the machine are cast projections $d\ d\ d\ d$, on which are the bearings of the shaft $h$ and $h$ of the bevel-pinions L and L, and these pinions support and give the proper motions to side-supporting dies $f f$, that support the outer edge of the shoe, as before mentioned. Their axes of motion are in a plane between the centers of the creasing-shaft N and the center shaft, F, as shown by the side view, Fig. 3. They gear into and are driven by bevel-teeth cast upon the sides of the lower dies, J and J, and upon segments B B, bolted onto the great roll H. The teeth upon the great roll and upon the pinions are in the proportion of two to one, and they are placed on circles, (except those portions which bring the side supports into immediate contact with the outer edge of the shoe.) There the pinions are curved, as shown in detail in Figs. 5 and 6, and corresponding projections are given to the teeth on the lower dies, J and J. This arrangement produces a varying motion of the side supports and prevents the least bulging or yielding of the outer edge of the shoe, and consequently the metal is prevented from splitting or cracking while the creasing and punching of the shoe are being done, as is herein elsewhere described, the side supports being so contrived and operated as to be constantly in contiguity with the edge of the shoe immediately opposite to the point where the creasing or punching is going on; but they are not intended in any manner to swage or change the form of the shoe, but only to act negatively to prevent any such change on the parts with which they are in contact. One of these side supports is represented separately in Fig. 7, and in its place, attached to the bevel-pinion, in Figs. 5 and 6. They are best made of cast-steel or chilled cast-iron. A suitable place for their reception is cast upon the bevel-pinions, as shown at $f'$. They are attached by screw-bolts passing through oblong holes, by which they are adjusted to their proper places. The faces of the side supports must be adapted to the size and form of the shoe to be made. The most common form is shown in the drawings. It must be such that they shall accurately meet and press against that portion of the outer edge of the shoe which is being creased.

For the purpose of properly and conveniently adjusting the position of the creasers with reference to the lower dies and the side supports, I have devised a method that is represented in Figs. 1, 2, 4, 8, and 10. A ring, E, (shown separately in Fig. 8) with a projection or lug, $g$, cast upon it, is attached to the shaft N by the key $a$. The pinion S (shown separately in Fig. 10) moves upon the shaft and has projections $n$ and $n$ cast upon its side, that extend out on each side of the lug $g$. Set-screws $c$ and $c$ pass through these projections and bear against the lug $g$, by turning which the position of the pinion on the shaft may be accurately adjusted and the crease brought nearer to or removed farther from the toe of the shoe.

Between the ring E and the pinion S, I usually place another movable ring, P, (shown separately in Fig. 9,) with projections $b$ and $b$ cast upon it and the teeth $o$ $o$ $o$. These teeth and projections are placed between two other projections, $i$ and $i$, cast upon the side of the pinion S. Set-screws $e$ and $e$, passing through $i$ and $i$ and bearing against $b$ and $b$, serve to adjust the teeth with reference to those of the pinion, so as in effect to increase their width and prevent any backlash or looseness in the gearing at the places where the dies come into operation.

I am aware that four eccentric rolls have been made to act simultaneously upon the four sides of a piece of iron for the purpose of swaging or giving shape to each of those four sides. I do not therefore claim, broadly, the use of such rolls acting in that manner for such a purpose.

I am also aware that N. C. Lewis has obtained a patent dated August 7, 1860, for a special arrangement of four eccentrics for forming file-blanks and other like articles, including the shaping of the bars or blanks from which horseshoes are to be formed. I do not use my rolls for drawing out or shaping blanks of any description, but merely for finishing horseshoes which have been previously prepared and bent into the proper shape by other means. My rolls are so arranged and operated that while three of their number merely prevent the iron of the shoe from spreading or yielding, the fourth creases the shoe and punches the holes for the nails, and thus finishes it without any danger of its bulging, cracking, or splitting. My invention is consequently wholly different both in its general purpose and in the mode of its operation from that of the said Lewis, and I therefore, for the purpose of this application, now disclaim the invention and improvements and all right thereto or any part thereof which are properly secured by the said patent to the said Lewis; but What I do claim as new, and desire to secure by Letters Patent, is—

1. The peculiar arrangement of four eccentrics operating simultaneously in a machine of this kind by which a horseshoe which has been previously shaped may be punched, creased, and finished without any bulging of the outer surface and without the danger of the shoe being split or cracked, substantially as above described.

2. Giving a varying motion to the side supports in my said machine, by which I secure a uniformity of motion between the surfaces of those supports and the edges of the shoe with which they respectively come in contact by means which are above substantially set forth.

3. The mode of adjusting the creasers, as above set forth.

HENRY BURDEN.

Witnesses:
WM. F. BURDEN,
JNO. L. G. KNOX.